United States Patent
Kim et al.

(10) Patent No.: US 7,691,530 B2
(45) Date of Patent: Apr. 6, 2010

(54) CYLINDRICAL LITHIUM SECONDARY BATTERY

(75) Inventors: Jong Ku Kim, Youngin-si (KR); Soon Ki Woo, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1196 days.

(21) Appl. No.: 11/261,402

(22) Filed: Oct. 27, 2005

(65) Prior Publication Data

US 2006/0099502 A1 May 11, 2006

(30) Foreign Application Priority Data

Oct. 28, 2004 (KR) .................. 10-2004-0086899

(51) Int. Cl.
*H01M 2/08* (2006.01)
*H01M 4/00* (2006.01)

(52) U.S. Cl. .................. 429/174; 429/94; 429/186

(58) Field of Classification Search .................. 429/94, 429/164, 208, 623.1
See application file for complete search history.

(56) References Cited

U.S. PATENT DOCUMENTS

| 5,882,815 | A * | 3/1999 | Tagawa | 429/94 |
| 6,805,996 | B2 * | 10/2004 | Hosoya | 429/94 |
| 2001/0036571 | A1 | 11/2001 | Oogami et al. | |
| 2003/0072993 | A1 * | 4/2003 | Kim et al. | 429/94 |
| 2003/0148175 | A1 * | 8/2003 | Iwanaga et al. | 429/130 |

FOREIGN PATENT DOCUMENTS

| JP | 08-250155 | 9/1996 |
| JP | 2003-229177 | 8/2003 |

OTHER PUBLICATIONS

Patent Abstracts of Japan for Publication No. 08-250155; Date of publication of application Sep. 27, 1996, in the name of Tagawa Kazuo.
Patent Abstracts of Japan for Publication No. 2003-229177; Date of publication of application Aug. 15, 2003, in the name of Iwanaga Masato et al.

* cited by examiner

*Primary Examiner*—Dah-Wei D Yuan
*Assistant Examiner*—Amanda Barrow
(74) *Attorney, Agent, or Firm*—Christie, Parker & Hale, LLP (57) ABSTRACT

A cylindrical lithium secondary battery includes a wound electrode assembly having a first electrode plate, a second electrode plate, and a separator interposed between the first electrode plate and the second electrode plate. A core member is substantially in a shape of a pipe and has a cut formed along a longitudinal direction thereof, the cut forming two edges. The core member is inserted into a central space of the electrode assembly and has a predetermined deformation direction when subjected to external pressure. The battery also includes a case with a space for accommodating the electrode assembly and an open upper portion, and a cap assembly fixed to the upper portion of the case to hermetically seal the upper portion of the case.

8 Claims, 7 Drawing Sheets

CYLINDRICAL LITHIUM SECONDARY BATTERY

CROSS REFERENCE TO RELATED APPLICATION

This application claims the benefit of and priority to Korean Patent Application No. 10-2004-0086899, filed on Oct. 28, 2004 in the Korean Intellectual Property Office, the entire content of which is incorporated herein by reference.

FIELD OF THE INVENTION

The present invention relates to a cylindrical lithium secondary battery, and more particularly, to a cylindrical lithium secondary battery capable of improving battery stability by determining a deformation direction of a core member in advance.

BACKGROUND OF RELATED ART

Recently, small-sized and light-weighted electric/electronic apparatuses such as cellular phones, notebook computers, and camcorders have become widely developed and manufactured. These portable electric/electronic apparatuses have built-in battery packs in order to operate in any place where a separate power supply is not provided. The built-in battery pack includes at least one battery for outputting a predetermined level voltage to drive the portable electric/electronic apparatus for a predetermined time period.

Recently, these battery packs have begun employing rechargeable secondary batteries for economical usage. The secondary batteries may generally include a nickel-cadmium (Ni—Cd) battery, a nickel-hydrogen (Ni-MH) battery, or a lithium secondary battery, such as a lithium (Li) battery or a lithium ion (Li-ion) battery.

The operating voltage (3.6 V) of a lithium secondary battery is three times higher than those of a nickel-cadmium battery or a nickel-hydrogen battery widely used for the portable electronic apparatuses. The energy density (energy per unit weight) of the lithium secondary battery is larger than that of a nickel-cadmium battery or a nickel-hydrogen battery. Therefore, the usage of lithium secondary batteries has rapidly increased.

In a lithium secondary battery, a lithium oxide material is used as a positive electrode activation material, and a carbon material is used as a negative electrode activation material. In general, the lithium secondary batteries are classified as a liquid electrolyte battery or a polymer electrolyte battery, according to the type of electrolyte solution used. In addition, a battery using a liquid electrolyte is called a lithium ion battery, and a battery using a polymer electrolyte is called a lithium polymer battery. In addition, lithium secondary batteries can be manufactured in various shapes. Representative shapes of the lithium secondary batteries include a cylinder, a polygon, and a pouch.

Typically, a cylindrical lithium secondary battery includes an electrode assembly having a positive electrode plate coated with a positive electrode activation material, a negative electrode plate coated with a negative electrode activation material, and a separator interposed between the positive and negative electrode plates to prevent short-circuit therebetween. These components are substantially cylindrically wound, and a cylindrical case accommodates the electrode assembly. An electrolyte solution is injected into the cylindrical case to allow lithium ions to move.

A cylindrical lithium secondary battery is typically manufactured as follows.

Firstly, a positive electrode plate coated with a positive electrode activation material and connected to a positive electrode tap, a negative electrode plate coated with a negative electrode activation material and connected to a negative electrode tap, and a separator are stacked. Next, the stack is wound in a substantially cylindrical shape, so that a substantially cylindrical electrode assembly is formed.

Next, the substantially cylindrical electrode assembly is accommodated into a cylindrical case, a process for preventing the electrode assembly from being separated is performed, the electrolyte solution is injected into the cylindrical case, and a sealing process is performed, so that a cylindrical lithium secondary battery is formed.

In general, in a cylindrical lithium secondary battery, an empty space is formed at a central portion of the electrode assembly. This may pose a problem, however, in that the electrode assembly may be unwound and deformed due to the empty space.

Figure 1:
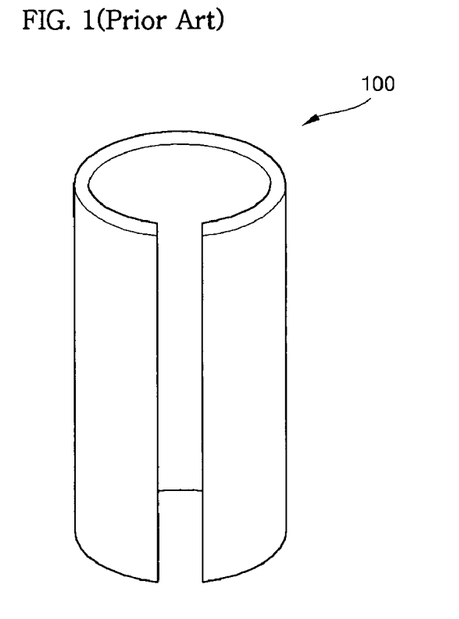
FIG. 1 is a perspective view of a conventional core member.

In order to solve this problem, there has been proposed a method of inserting a predetermined core member into the central space of the electrode assembly as shown in FIG. 1. In general, the core member 100 is formed by winding a kind of plate to have a circular cross section. In addition, a portion of the core member is cut along the longitudinal direction thereof.

However, there is a problem in that the core member 100 can be easily deformed or broken by external pressure. When the core member 100 is deformed or broken, the separator of the electrode assembly may be broken. The breakage of the separator may cause a short-circuit between the positive and negative electrode plates, which may cause the cylindrical lithium secondary battery to break or explode.

In addition, when the core member 100 is deformed due to external pressure, particularly, a lateral pressure, the cross section of the pipe shape may be non-uniformly deformed. Therefore, there is a problem in that the separator may be seriously broken.

SUMMARY

In order to solve the aforementioned problems, a cylindrical lithium secondary battery may be provided that is capable of improving battery stability by determining a deformation direction of a core member in advance.

According to an aspect of the present invention, a cylindrical lithium secondary battery includes a wound electrode assembly having a first electrode plate, a second electrode plate, and a separator interposed between the first and second electrode plates. A core member is substantially in a shape of a pipe where a cut is formed along a longitudinal direction thereof to form two edges. The core member is inserted into a central space of the electrode assembly. A deformation direction of the core member due to an exerted external pressure is determined in advance. A case has a space for accommodating the electrode assembly and an opened upper portion, and a cap assembly is fixed to the upper portion of the case to hermetically seal the upper portion of the case.

In one embodiment, one of the two edges of the core member may be disposed at an inner side of the other of the two edges thereof, so that the core member has a spirally wound shape when the external pressure is exerted.

In addition, a notch may be formed on a portion of an outer surface of the core member. The notch may also be disposed opposite to the cut and formed along a longitudinal direction of the core member.

A lower insulating plate may be disposed between the electrode assembly and a lower surface of the case, and an upper insulating plate may be disposed between the electrode assembly and the cap assembly.

In addition, one of the first and second electrode plates may be electrically connected through an electrode tap to a lower surface of the case, and the core member may be disposed on the electrode tap electrically connected to the lower surface.

According to another aspect of the present invention, a cylindrical lithium secondary battery includes a wound electrode assembly having a first electrode plate, a second electrode plate, and a separator interposed between the first and second electrode plates. A core member is substantially in a shape of a pipe and has a cut along a longitudinal direction thereof to form two edges. The core member is inserted into a central space of the electrode assembly, and one of the two edges of the core member is disposed at an inner side of the other of the two edges thereof. A case has a space for accommodating the electrode assembly and an opened upper portion, and a cap assembly is fixed to the upper portion of the case to hermetically seal the upper portion of the case.

BRIEF DESCRIPTION OF THE DRAWINGS

The above and other features and aspects of the present invention will become more apparent by description of exemplary embodiments thereof with reference to the attached drawings in which.

DETAILED DESCRIPTION

Embodiments of the present invention will be described with reference to the accompanying drawings. In the drawings, like reference numerals denote like components.

Figure 2A:
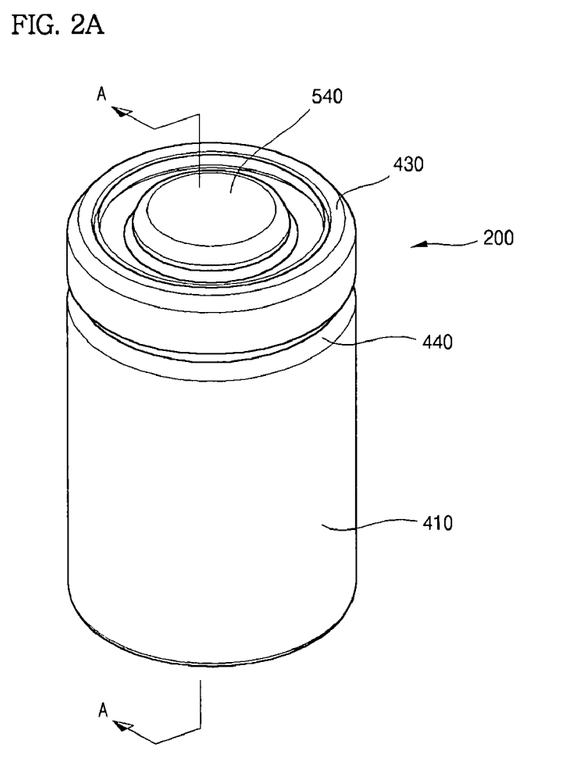
FIG. 2A is a perspective view of a cylindrical lithium secondary battery according to an embodiment of the present invention.
Figure 2B:
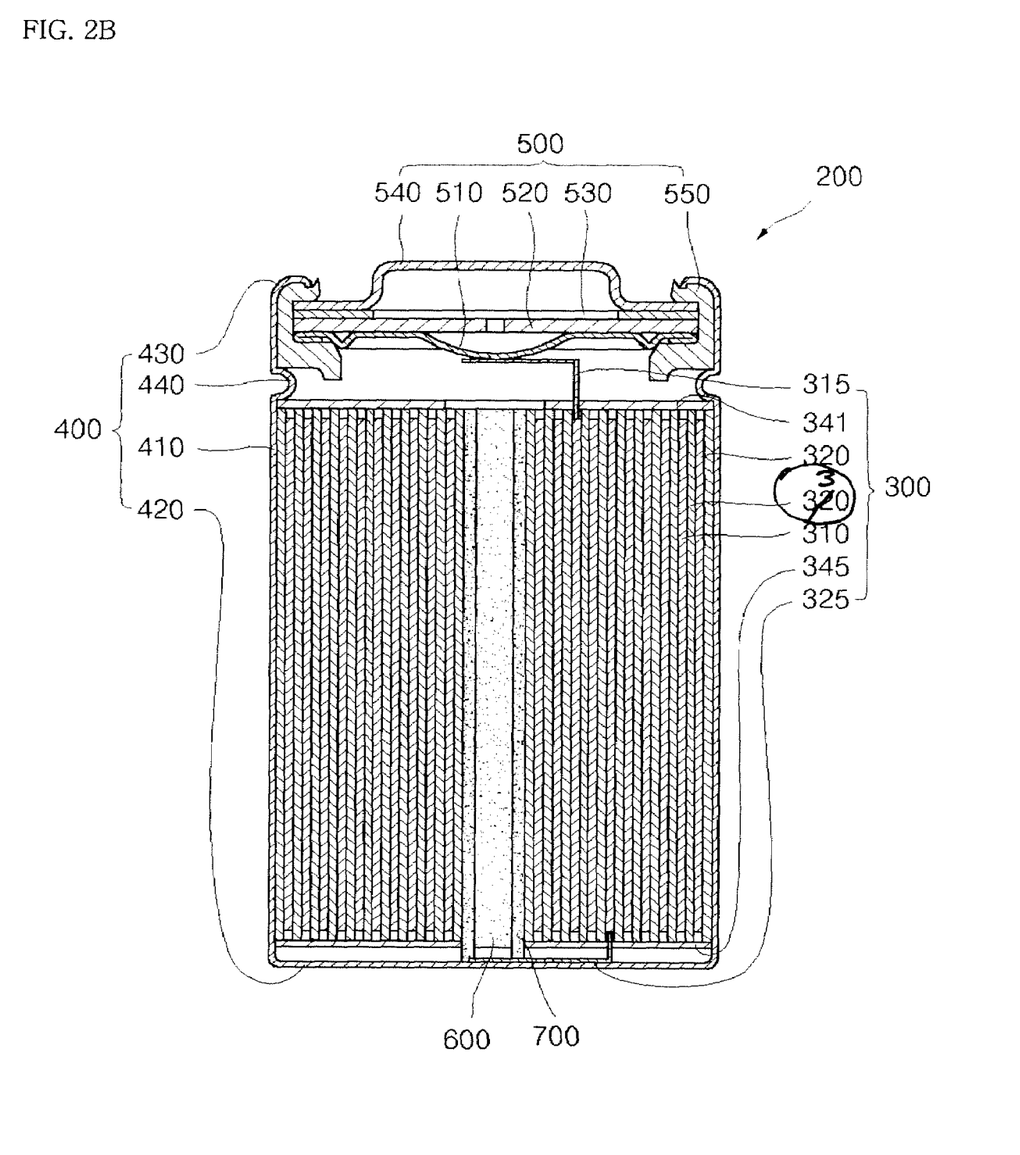
FIG. 2B is a cross sectional view taken line A-A of FIG. 2A.

As shown in FIGS. 2A and 2B, a cylindrical lithium secondary battery 200 according to an embodiment of the present invention includes an electrode assembly 300 for generating a voltage difference during charging and discharge periods, a cylindrical case 400 for accommodating the electrode assembly 300, a cap assembly 500 assembled to an upper portion of the cylindrical case 400 to prevent the electrode assembly 300 from being separated, an electrolyte solution 600 injected into the cylindrical case 400 to allow lithium ions to move in the electrode assembly 300; and a core member 700 disposed in a central space of the electrode assembly 300.

The electrode assembly 300 includes a first electrode plate 310 coated with one of a positive or a negative electrode activation material (for example, a positive material); a second electrode plate 320 coated with the other one of the positive and the negative electrode activation material (for example, a negative electrode activation material), and separator 330 disposed between the first and second electrode plates 310 and 320 to prevent short-circuiting between the first and second electrode plates 310 and 320 and to allow only the lithium ions to move therein. In addition, the first and second electrode plates 310 and 320 and the separator 330 are wound in a substantially circular shape and accommodated into the cylindrical case 400. In addition, a first electrode tap 315, made of generally aluminum (Al) and protruding upwardly in a predetermined length, is connected to the first electrode plate 310. In addition, a second electrode tap 325 made of generally nickel (Ni) and protruding downwardly in a predetermined length is connected to the second electrode plate 320. However, the present invention is not limited thereto. In addition, on upper and lower portions of the electrode assembly 300, upper and lower insulating plates 341 and 345 are attached in order to avoid a direct contact with the cap assembly 500 and the cylindrical case 400, respectively.

The cylindrical case 400 has an opening area in which the cylindrical electrode assembly 300 is situated, and a cylindrical side surface plate 410 having a predetermined diameter. On a lower portion of the cylindrical side surface plate 410, a bottom plate 420 closes an end of the cylindrical case 400. An upper portion of the cylindrical side surface plate 410 is opened, so that the electrode assembly 300 may be inserted. At a center of the bottom plate 420 of the cylindrical case 400, one of first and second electrode taps 315 and 325 (for example, the second electrode tap 325) of the electrode assembly 300 is attached, so that the cylindrical case 400 also functions as one of the first and second electrode plate 310 and 320 (for example, an negative electrode port). In addition, the cylindrical case 400 is generally made of aluminum (Al), iron (Fe), or an alloy thereof. In addition, the cylindrical case 400 comprises a crimping portion 430 having a one-side bending structure to press the upper portion of the cap assembly 500 in a downward direction and a beading part 440 having an inwardly-recessed structure to press the lower portion of the cap assembly 500 in an upward direction.

The cap assembly 500 includes a conductive safety vent 510 to which the first electrode tap 315 is welded and of which shape is inverted in case of overcharge or abnormal heat generation. A printed circuit board (PCB) 520 is electrically and mechanically connected to an upper portion of the conductive safety vent 510, and a circuit is disconnected at the time of inversion of the conductive safety vent 510. A positive temperature device 530 electrically and mechanically connects to an upper portion of the printed circuit board 520, and the circuit is disconnected at a predetermined temperature or more. A conductive electrode cap 540 is electrically and mechanically connected to an upper portion of the positive temperature device 530 to apply a real current to outside portions. An insulating gasket 550 has a shape of the surrounding circumferential portions of the safety vent 510, the printed circuit board 520, the positive temperature device 530, and the electrode cap 540 to insulate these components from the cylindrical case 400. In this embodiment, the electrode cap 540 is connected to one of the first and second electrode taps 315 and 325 (for example, the first electrode tap 315) of the electrode assembly 300, so that the electrode cap 540 has a similar function as the first electrode plate 310 (for example, the positive electrode port).

The electrolyte solution 600 serves as a movement medium for lithium (Li) Ions generated through an electrochemical reaction at positive and negative electrodes in the battery during charge and discharge periods. The electrolyte solution 600 may be a non-aqueous organic electrolyte solution which is a mixture of a lithium salt and a very pure organic solvent. In addition, the electrolyte solution 600 may be a polymer using a polymer electrolyte. However, the invention is not limited to these types of electrolyte solution.

The core member 700 is constructed in a shape of a substantial pipe, where a cut is formed along a longitudinal direction thereof. In addition, one of both edges of the cut is disposed at an inner side of the other edge thereof. The core member 700 is inserted into a central space of the wound electrode assembly 300 to prevent the wound electrode assembly 300 from relaxing and unwinding and to prevent deformation of the wound electrode assembly 300 due to an external pressure. In addition, if the second electrode tap 325 of the electrode assembly 300 is welded to a central portion of the bottom plate 420 of the cylindrical case 400, the core member 700 inserted into the central space of the wound electrode assembly 300 presses the second electrode tap 325, so that the second electrode tap 325 can be in contact with the bottom plate 420 of the cylindrical case 400.

Figure 3A:
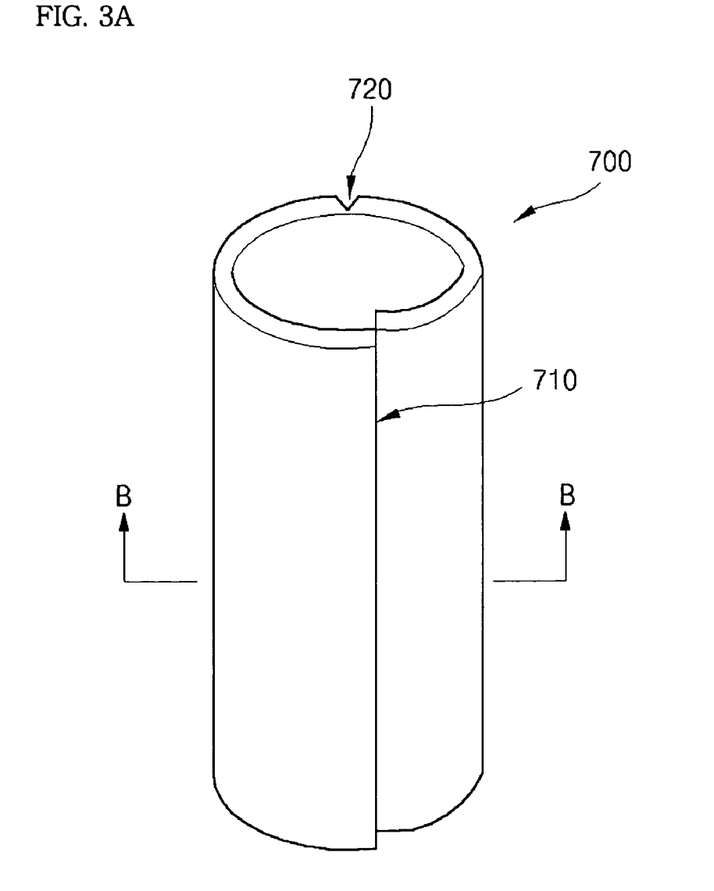
FIG. 3A is a perspective view of a core member of a cylindrical lithium secondary battery according to an embodiment of the present invention.
Figure 3B:
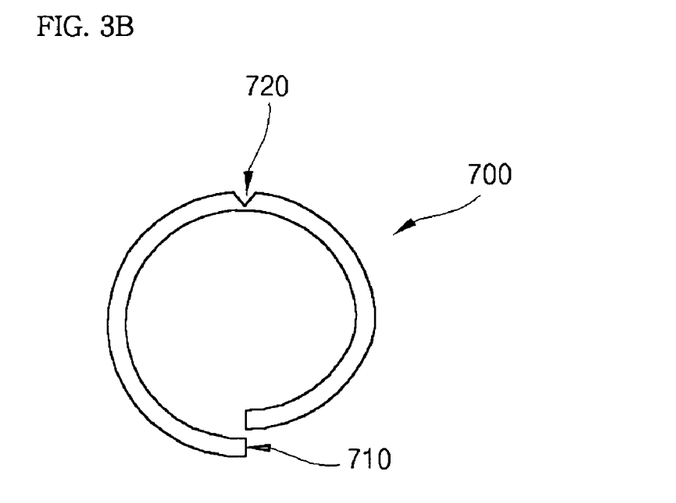
FIG. 3B is a cross sectional view taken line B-B of FIG. 3A.

Referring to FIGS. 3A through 3B, the core number 700 of the cylindrical lithium secondary battery according to an embodiment of the present invention is constructed in a shape of a pipe where a cut 710 is formed in a longitudinal direction. In addition, one of both edges of the cut 710 is disposed at an inner side of the other edge thereof.

When the core member 700 is deformed due to an external pressure, since the deformation direction of the core member 700 is determined in advance, it is possible to minimize the influence on the electrode assembly 300 caused by the deformation of the core member 700. In particular, when the core member 700 is deformed, the separator 330 of the electrode assembly 300 may be broken at a location with the highest probability. In this case, since one of the two edges of the cut 710 of the core member 700 is disposed at the inner side of the other edge thereof, when the core member 700 is deformed due to the external pressure, the core member 700 can be spirally wound in an internal direction thereof. Therefore, it is possible to prevent bending deformation of the core member 700. As a result, the influence on the electrode assembly 300 caused by the deformation of the core member 700 can be minimized. In this case, it is possible to further increase resistance of the core member 700 against a longitudinal external pressure.

In addition, a notch is formed on a portion of an outer surface of the core member 700. Therefore, when a lateral external pressure is exerted on the core member 700, the core member 700 can be more easily deformed. In this embodiment, therefore, the notch 720 is disposed opposite to the cut 710. If the notch 720 is disposed opposite to the cut 710, the cross section of the core member 700 can be uniformly deformed with respect to the notch 720 when the lateral pressure is exerted on the core member 700.

Figure 4:
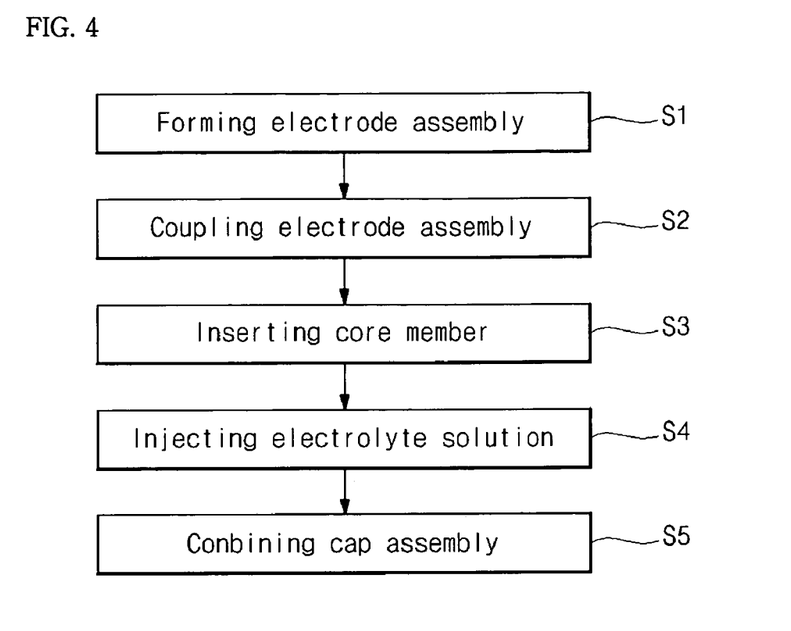
FIG. 4 is a flowchart of a method of manufacturing a cylindrical lithium secondary battery according to an embodiment of the present invention.

Referring to FIGS. 2A and 4, a method of manufacturing a cylindrical lithium secondary battery according to an embodiment of the present invention includes an electrode assembly forming step S1 of forming an electrode assembly 300; an electrode assembly coupling step S2 of coupling the electrode assembly 300; a core member inserting step S3 of inserting a core member 700; a electrolyte solution injection step S4 of injecting an electrolyte solution 600; and a cap assembly combining step S5 of combining a cap assembly 500.

Figure 5A:
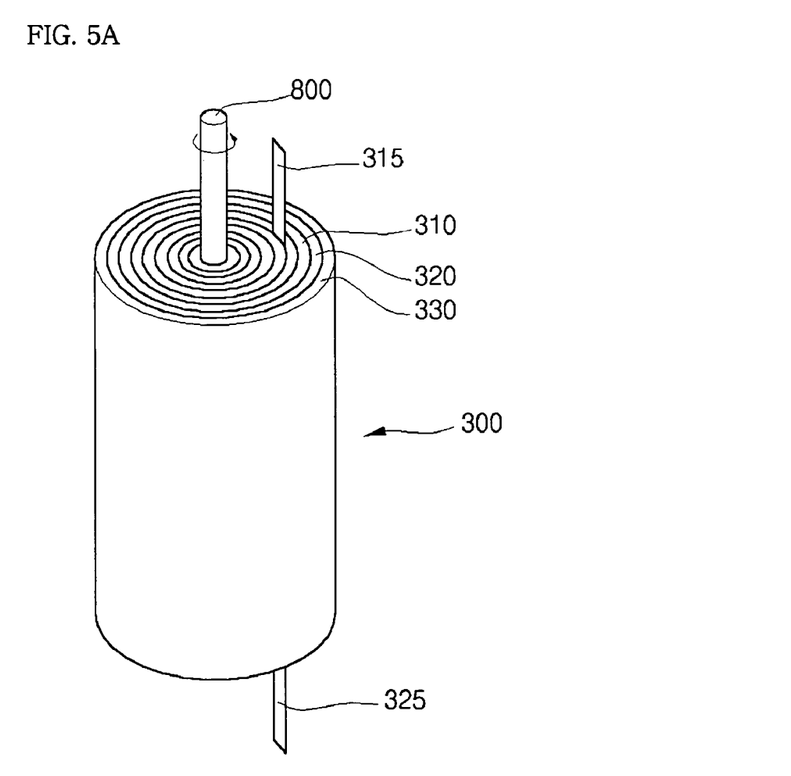
FIG. 5A is a perspective view of an electrode assembly and a winding shaft according to an embodiment of the present invention.

Referring to FIGS. 4 and 5A, firstly in the electrode assembly forming step S1, the first electrode plate 310, the separator 330, and the second electrode plate 320 are sequentially stacked. Next, a winding shaft 800 is disposed at one end of the stacked structure, and the stacked structure is wound in a substantially wound shape, so that the electrode assembly 300 is completed. In this embodiment, before the winding process is completed, the first and second electrode taps 315 and 325 are attached to the first and second electrode plates 310 and 320, respectively.

Figure 5B:
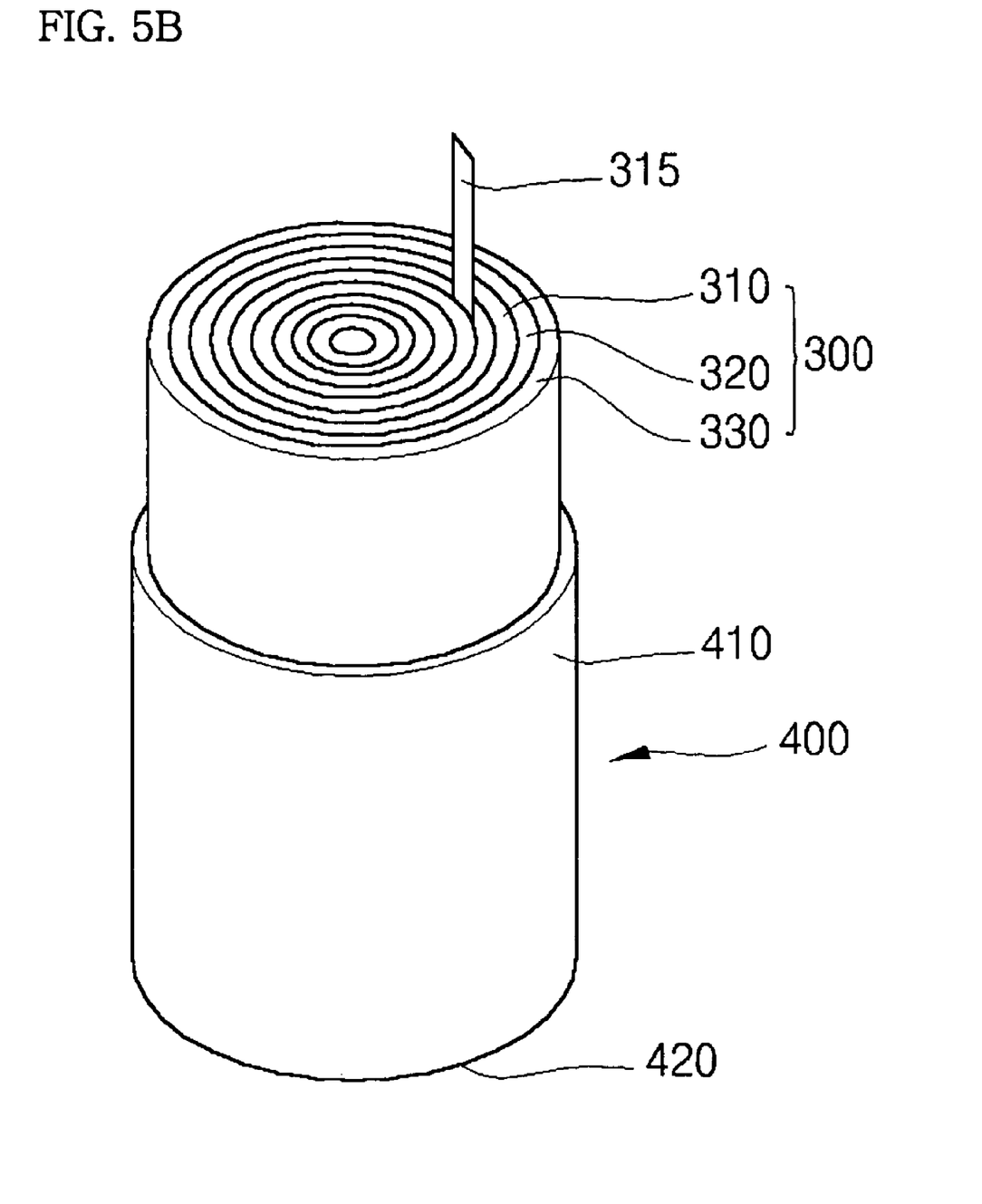
FIG. 5B is a partial cut out view of a cylindrical lithium secondary battery including the electrode assembly of FIG. 5A.

Referring to FIGS. 4 and 5B, in the electrode assembly coupling step S2, the cylindrical electrode assembly 300 is coupled to the cylindrical case 400. After the electrode assembly 300 is coupled to the cylindrical case 400, the winding shaft 800 is separated from the electrode assembly 300, so that a substantially cylindrical space is formed at the central portion of the electrode assembly 300.

In this embodiment, the winding shaft 800 may be separated before the electrode assembly 300 is coupled, but the present invention is not limited thereto. In addition, the lower insulating plate 341 (not shown) is coupled to the cylindrical case 400 in advance.

Figure 5C:
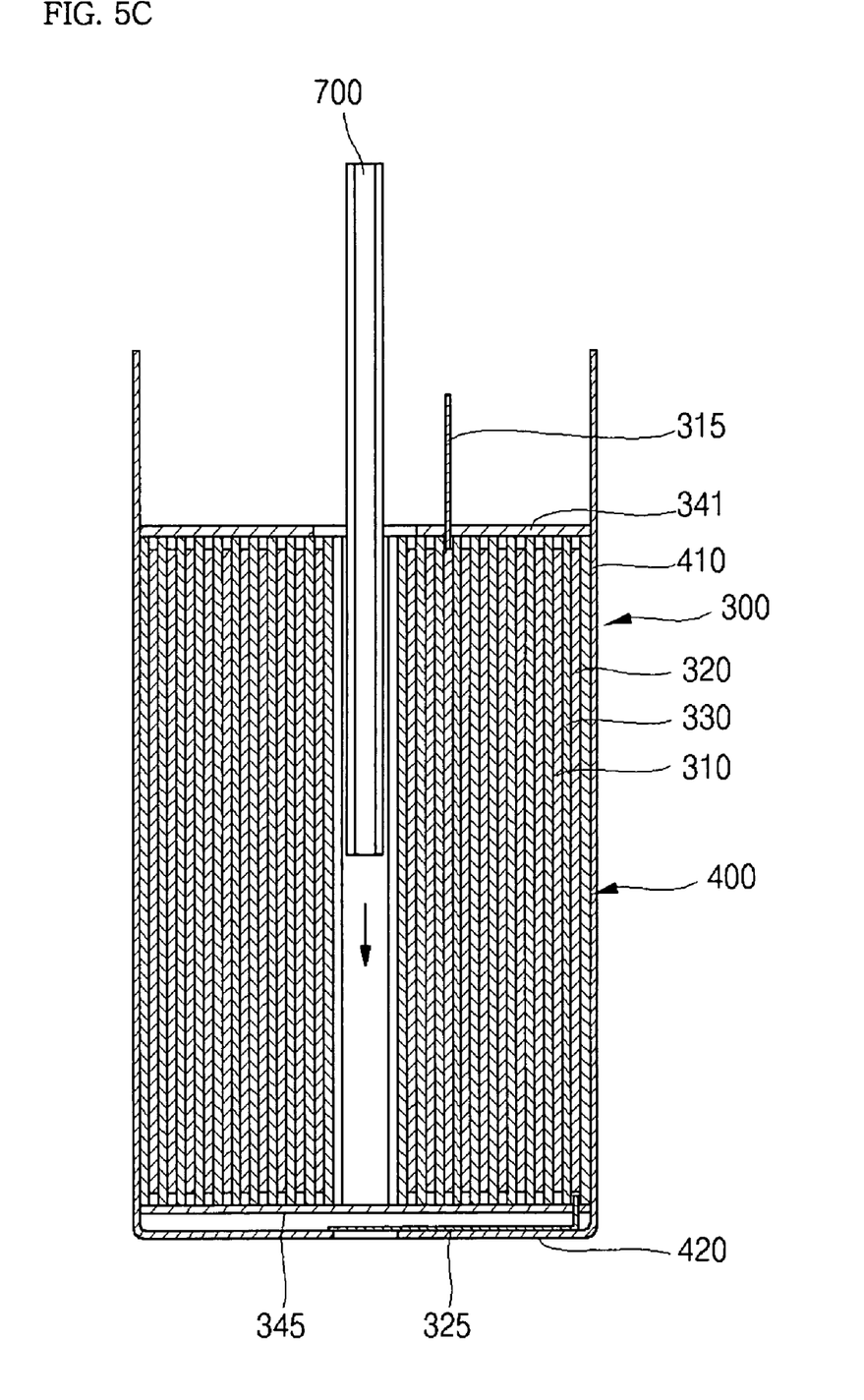
FIG. 5C is a cross-sectional view of the cylindrical lithium secondary battery of FIG. 5B with a core member according an embodiment of the invention.

Referring to FIGS. 4 and 5C, the core member inserting step S3, the core member 700 is inserted in the space of the central portion of the electrode assembly 300, which is generated by separating the winding shaft 800.

Before the core member 700 is inserted, one of the first and second electrode taps 315 and 325 of the electrode assembly 300 (for example, the second electrode tap 325) may be attached to the bottom plate 420 of the cylindrical case 400 by using a resistance welding process. Therefore, the core member 700 is disposed to be in contact with an upper surface of the second electrode tap 325 to have a function of strongly coupling the second electrode tap 325 to the cylindrical case 400. The core member 700 may have a height of about 90% to 110% of the height of the electrode assembly 300. If the height of the core member 700 is less than 90% of the electrode assembly 300, a force for fixing and supporting the electrode assembly 300 may be too weak. In addition, if the height of the core member 700 is more than 110% of the height of the electrode assembly 300, the core member 700 may be in contact with the components of the cap assembly 500.

Next, in the electrolyte solution injection step S4, the electrolyte solution 600 is injected up to the upper end of the electrode assembly 300. In addition, the electrolyte solution 600 has a function of allowing the lithium ions to move between the first and second electrode plates 310 in the electrode assembly 300 during charge and discharge periods.

Figure 5D:
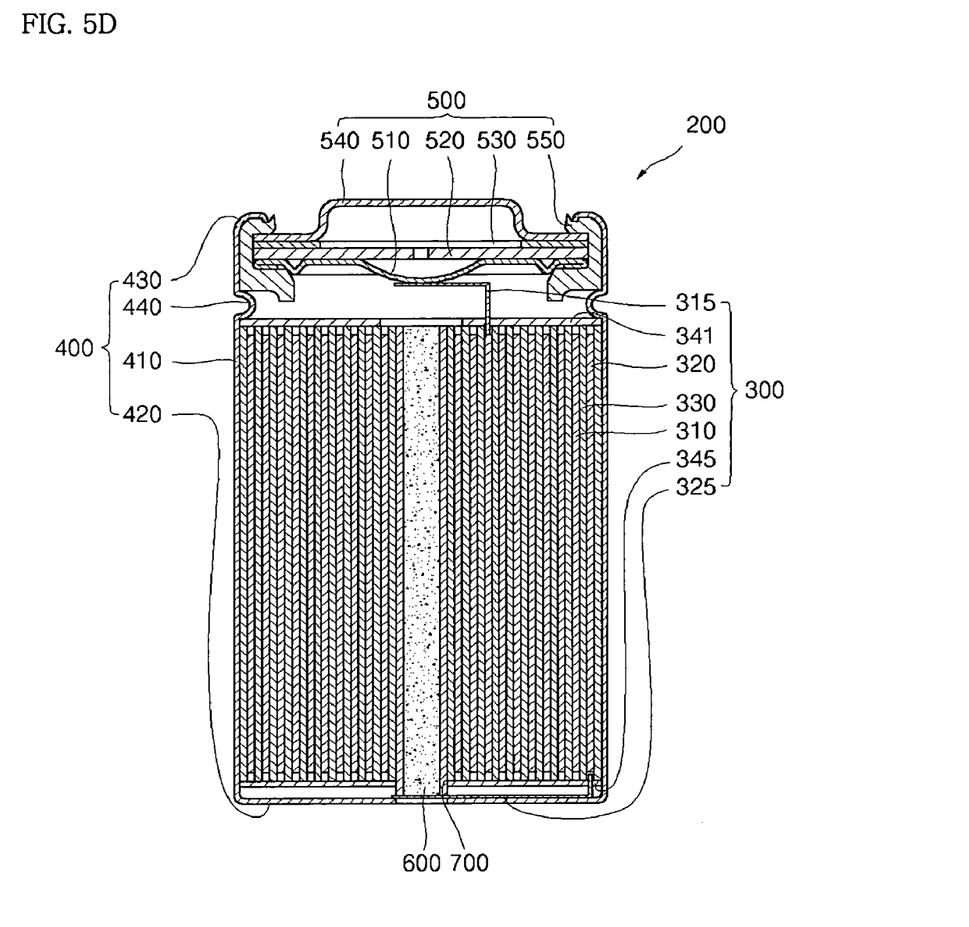
FIG. 5D is a cross-sectional view of the cylindrical lithium secondary battery of FIG. 5C in completed form according an embodiment of the invention.

Referring to FIGS. 4 and 5D, in the cap assembly combining step S5, the cap assembly 500 constructed with a plurality of components is fixed to the upper portion of the cylindrical case 400 to prevent the electrode assembly 300 and the core member 600 from being detached and to prevent the electrolyte solution from leaking out.

More specifically, an insulating gasket 550 having a shape of a ring is fixed to the upper portion of the cylindrical case 400, and a conductive safety vent 510 electrically connected to one of the first and second electrode taps 315 and 325 of the electrode assembly 300 (for example, the first electrode tap 315), and a printed circuit board 520, a positive temperature device 530, and an electrode cap 540 are sequentially fixed.

Next, a portion of the cylindrical case 400 corresponding to a lower portion of the insulating gasket 530 is subject to a beading process, so that a beading portion 440 is formed to be recessed inwardly. In addition, the upper portion of the cylindrical case 400 is subject to a crimping process to form a crimping portion 430. By means of the beading portion 440 and the crimping portion 430, it is possible to prevent the cap assembly 500 from being detached. As a result, the cylindrical lithium secondary battery 200 is completed.

Figure 6:
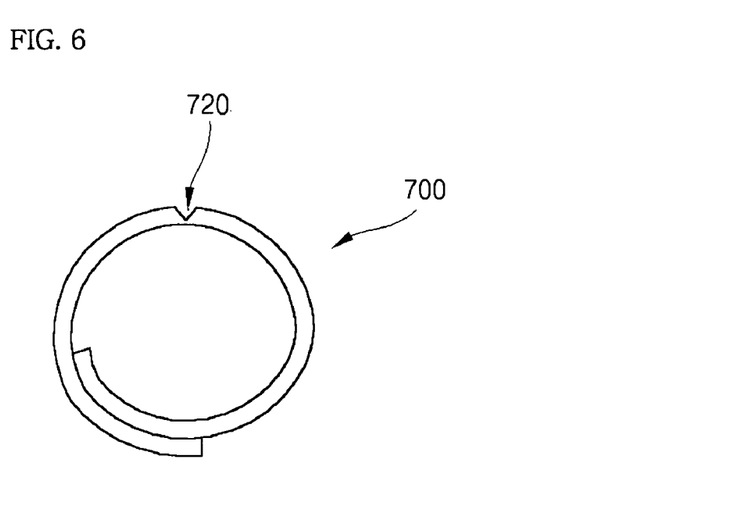
FIG. 6 is a top view showing a deformation of a core member with respect to an external pressure in a cylindrical lithium secondary battery according to another embodiment of the present invention.

Referring to FIG. 6, when external pressure, more particularly a lateral pressure, is exerted on the cylindrical lithium secondary battery 200, the core member 700 is spirally wound and deformed. This occurs because one of the two edges of the cut 710 of the core member 700 is disposed at an inner side of the other edge thereof, and the notch 720 is disposed at an outer surface of the core member 700.

As described above, when the lateral pressure is exerted on the core member 700 of cylindrical lithium secondary battery 200, the core member 700 is spirally wound in an internal direction thereof and deformed. Therefore, it is possible to prevent bending deformation of the core member 700. Namely, it is possible to increase resistance of the core member 700 against such external pressure.

As a result, the stability of the cylindrical lithium secondary battery 200 against the external pressure can be improved.

It is thus possible to provide a cylindrical lithium secondary battery capable of improving battery stability by determining a deformation direction of a core member in advance.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof.

What is claimed is:

1. A cylindrical lithium secondary battery comprising:
    a wound electrode assembly having a first electrode plate, a second electrode plate, and a separator interposed between the first electrode plate and the second electrode plate;
    a core member substantially in a shape of a pipe and having a cut formed along a longitudinal direction thereof, the cut forming two edges, the core member being inserted into in a central space of the electrode assembly and having a predetermined deformation direction responsive to an exerted external pressure, wherein a notch extends along an entire length of the core member in a longitudinal direction of the core member on an outer surface of the core member;
    a case having a space for accommodating the electrode assembly and an open upper portion; and
    a cap assembly fixed to the open upper portion of the case to hermetically seal the upper portion of the case.

2. The cylindrical lithium secondary battery according to claim 1, wherein one of the two edges is at an inner side of the other of the two edges, such that the core member is configured to have a spirally wound shape in response to the external pressure.

3. The cylindrical lithium secondary battery according to claim 1, wherein the notch is located opposite to the cut on the core member.

4. The cylindrical lithium secondary battery according to claim 1, further comprising:
    a lower insulating plate between the electrode assembly and a lower surface of the case; and
    an upper insulating plate between the electrode assembly and the cap assembly.

5. The cylindrical lithium secondary battery according to claim 1,
    wherein one of the first electrode plate and the second electrode plate is electrically connected through an electrode tap to a bottom surface of the case, and
    wherein the core member is on the electrode tap electrically connected to the bottom surface of the case.

6. A cylindrical lithium secondary battery comprising:
    a wound electrode assembly having a first electrode plate, a second electrode plate, and a separator interposed between the first electrode plate and the second electrode plate;
    a core member substantially in a shape of a pipe where a cut is formed along a longitudinal direction thereof, the cut forming two edges, the core member being inserted into a central space of the electrode assembly and having one of the two edges disposed at an inner side of the other of the two edges, wherein a notch extends along an entire length of the core member in a longitudinal direction of the core member on an outer surface of the core member;
    a case having a space for accommodating the electrode assembly and an opened upper portion; and
    a cap assembly fixed to the upper portion of the case to hermetically seal the upper portion of the case.

7. The cylindrical lithium secondary battery according to claim 6, wherein the two edges are relative to each other such that if the core member is subjected to an external pressure, the core member deforms along a direction into a spirally wound shape.

8. The cylindrical lithium secondary battery according to claim 6, wherein the notch is opposite to the cut on the core member.

* * * * *